United States Patent
Ishigaki et al.

(10) Patent No.: US 10,107,611 B2
(45) Date of Patent: Oct. 23, 2018

(54) METHOD OF DETECTING LIFT AMOUNT OF VALVE

(71) Applicant: TOYOTA JIDOSHA KABUSHIKI KAISHA, Toyota-shi, Aichi-ken (JP)

(72) Inventors: Shoichi Ishigaki, Okazaki (JP); Masatsugu Kajiwara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 107 days.

(21) Appl. No.: 15/440,563

(22) Filed: Feb. 23, 2017

(65) Prior Publication Data
US 2017/0254635 A1 Sep. 7, 2017

(30) Foreign Application Priority Data
Mar. 4, 2016 (JP) .................. 2016-042490

(51) Int. Cl.
*G01B 7/14* (2006.01)
*F01L 3/24* (2006.01)
*G01B 5/00* (2006.01)
*G01D 5/20* (2006.01)
*F01L 3/10* (2006.01)

(52) U.S. Cl.
CPC .................. *G01B 7/14* (2013.01); *F01L 3/24* (2013.01); *G01B 5/0032* (2013.01); *G01D 5/202* (2013.01); *F01L 3/10* (2013.01); *F01L 2103/00* (2013.01); *F01L 2103/01* (2013.01); *F01L 2820/045* (2013.01)

(58) Field of Classification Search
CPC ........ G01B 7/14; G01B 5/0032; G01D 5/202; F01L 3/24; F01L 2103/01; F01L 2103/00; F01L 3/10; F01L 2820/045
See application file for complete search history.

(56) References Cited

U.S. PATENT DOCUMENTS

| | | | | |
|---|---|---|---|---|
| 4,672,843 A * | 6/1987 | Pozniak | ................ | F02P 5/1455 |
| | | | | 73/114.16 |
| 4,945,766 A * | 8/1990 | Dahlmann | ............. | G01B 17/00 |
| | | | | 382/152 |
| 7,975,533 B2 * | 7/2011 | Andrie | ...................... | F01L 1/46 |
| | | | | 73/114.16 |
| 9,404,397 B2 * | 8/2016 | Verner | ...................... | F01L 1/34 |
| 9,506,381 B2 * | 11/2016 | Kubani | ............... | F01L 13/0015 |
| 2009/0293597 A1 * | 12/2009 | Andrie | ...................... | F01L 1/46 |
| | | | | 73/114.16 |
| 2017/0044977 A1 | 2/2017 | Courtial et al. | | |

FOREIGN PATENT DOCUMENTS

| | | |
|---|---|---|
| JP | S54-049698 U | 4/1979 |
| JP | H05-256113 A | 10/1993 |
| JP | H11-303613 A | 11/1999 |
| JP | 2004-060616 A | 2/2004 |

(Continued)

*Primary Examiner* — Freddie Kirkland, III
(74) *Attorney, Agent, or Firm* — Oliff PLC

(57) ABSTRACT

According to a method of detecting a lift amount of a valve, an area-increasing jig is attached to an upper surface of a retainer attached to the valve. The area-increasing jig has a larger width than a width of the upper surface of the retainer. Then a lift amount of the valve is detected by measuring a distance to the area-increasing jig by using a non-contact sensor disposed above the retainer.

2 Claims, 3 Drawing Sheets

(56) References Cited

FOREIGN PATENT DOCUMENTS

| | | |
|---|---|---|
| JP | 2004-293346 A | 10/2004 |
| JP | 2007-260885 A | 10/2007 |
| JP | 2007-303849 A | 11/2007 |
| JP | 2008-075613 A | 4/2008 |
| JP | 2008-088909 A | 4/2008 |

* cited by examiner

FIG. 2
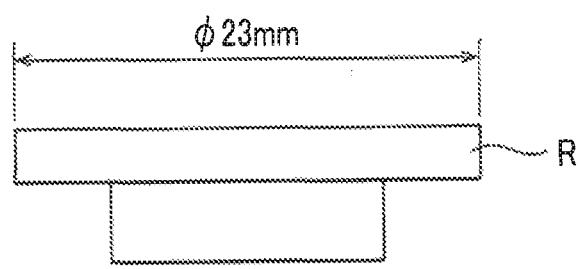
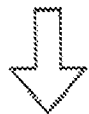
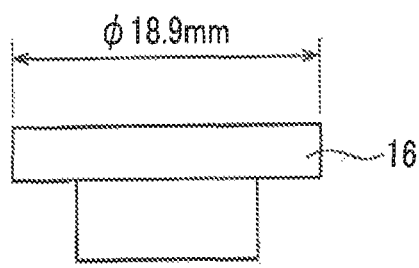

METHOD OF DETECTING LIFT AMOUNT OF VALVE

INCORPORATION BY REFERENCE

The disclosure of Japanese Patent Application No. 2016-042490 filed on Mar. 4, 2016 including the specification, drawings and abstract is incorporated herein by reference in its entirety.

BACKGROUND

1. Technical Field

The present disclosure relates to a method of detecting a lift amount of a valve.

2. Description of Related Art

In an engine of a vehicle, the amount of air to be taken into the engine is controlled by a throttle valve to adjust the output from the engine. Thus, in a low-load region, the throttle valve tends to be closed and the ratio of pumping loss due to suction of air is increased. In view of this, there is Valvematic that is a mechanism configured to continuously vary the lift amount of an intake valve to cause the intake valve to function as a throttle valve. With this configuration, the efficiency and fuel economy are enhanced by decreasing the intake loss.

In the inspection of the Valvematic, the lift, amount (upward-downward travel amount; opening-closing amount) of the valve is periodically measured in a state in which the engine has been assembled.

In this measurement method, for example, an eddy-current non-contact sensor (gap sensor) is provided in an engine, and an upward-downward travel amount of a retainer attached to a valve is measured by the non-contact sensor. Japanese Patent Application Publication No. 2007-303849 (JP 2007-303849 A) describes a valve lift characteristic detection apparatus configured to measure a lift amount of an upper surface of a retainer by using an eddy-current sensor, thereby detecting valve lift characteristics of a valve.

In accordance with the current trend towards downsizing of an engine, reduction in weight of a valve spring has been promoted as part of shape modifications of a space in a cylinder head and parts. A so-called beehive spring has been employed as a valve spring.

More specifically, an increase in load at the time of maximum compression of a valve spring, which is a compression coil, (load at the time when an engine valve is fully opened) may lead to an increase in friction, abrasion, and the like, in an engine, and may cause deterioration in fuel economy. In view of this, the above-described beehive spring having a lower mass is employed as a valve spring that is one of movable parts in the engine, as a measure for reducing a load at the time of maximum compression of the valve spring without a decrease in rotation limit of the engine.

In such a beehive spring, the coil diameter on the retainer side is made smaller than that on the other side. This configuration allows reduction in size and weight of a retainer that is a movable part.

Although reduction in size of a retainer leads to enhancement of fuel economy of an engine, reduction in size of the retainer makes it difficult to measure an upward-downward travel amount of the retainer by using a non-contact sensor. This makes it difficult to perform the inspection of the Valvematic.

SUMMARY

The present disclosure provides a method of detecting a lift amount of a valve, the method making it possible to accurately measuring an upward-downward travel amount of a downsized retainer, thereby accurately detecting a lift amount of a valve.

An aspect of the present disclosure relates to a method of detecting a lift amount of a valve. The method includes: attaching an area-increasing jig to an upper surface of a retainer attached to the valve, the area-increasing jig having a larger width than a width of the upper surface of the retainer; and detecting a lift amount of the valve by measuring a distance to the area-increasing jig by using a non-contact sensor disposed above the retainer.

According to the method of the present disclosure, a distance to the area-increasing jig is measured by the non-contact sensor in a state in which the area-increasing jig having a larger width than the width of the upper surface of the retainer is attached to the upper surface of the retainer. Thus, even when the retainer has a reduced size and it is impossible or difficult to detect the retainer by using the non-contact sensor, an upward-downward travel amount of the retainer can be detected by the non-contact sensor because the area-increasing jig having desired planar dimensions is attached to the retainer.

The area-increasing jig may be, for example, in the form of a plate, and the shape of the area-increasing jig in a plan view may be various shapes, such as a circular shape, an oval shape, and a rectangular shape.

In addition, the planar dimensions of the area-increasing jig may be set to dimensions that enable detection of the area-increasing jig by using the non-contact sensor, based on, for example, the mounting position of the non-contact sensor.

While sensors based on various principles, such as an eddy-current sensor, a capacitance sensor, an ultrasonic sensor, and a laser sensor may be employed as the non-contact sensor to be used, an eddy-current sensor is preferable in detecting a lift amount of the valve that travels at high speed.

The area-increasing jig may be attached to the upper surface of the retainer with an adhesive agent, so that the area-increasing jig attached to the upper surface of the retainer is prevented from dropping from the upper surface of the retainer even when the valve travels upward or downward.

The shape of the area-increasing jig may be a plate shape, and the area-increasing jig may include a groove continuously extending from a portion of a side surface of the area-increasing jig toward the center thereof, such that the area-increasing jig is attached to the upper surface of the retainer through which the valve passes.

The area-increasing jig includes the groove continuously extending from the side surface of the area-increasing jig toward the center thereof. With this configuration, the area-increasing jig can be disposed on the upper surface of the retainer by inserting the valve through the groove in a state in which the engine has been assembled.

In this way, according to the method of the present disclosure, by just attaching the area-increasing jig to the upper surface of the retainer, an upward-downward travel amount of the retainer having a reduced size can be detected by the same method as the conventional valve lift amount detection method. Moreover, the area-increasing jig is a simple member having, for example, a plate shape. Therefore, the cost of manufacturing the area-increasing jig is not high, so that the cost of detecting a valve lift amount does not increase.

As can be understood from the foregoing description, according to the method of the present disclosure, a distance to the area-increasing jig is measured by the non-contact sensor in a state in which the area-increasing jig having a larger width than the width of the upper surface of the retainer is attached to the upper surface of the retainer. Thus, even when the retainer has a reduced size and it is impossible or difficult to detect the retainer by using the non-contact sensor, a lift amount of the area-increasing jig can be detected by the non-contact sensor. This allows accurate detection of a lift amount of the valve.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 2 is a schematic view illustrating the comparison between the dimensions of a commonly-used retainer and the dimensions of a downsized retainer;

DETAILED DESCRIPTION OF EMBODIMENTS

Figure 1:
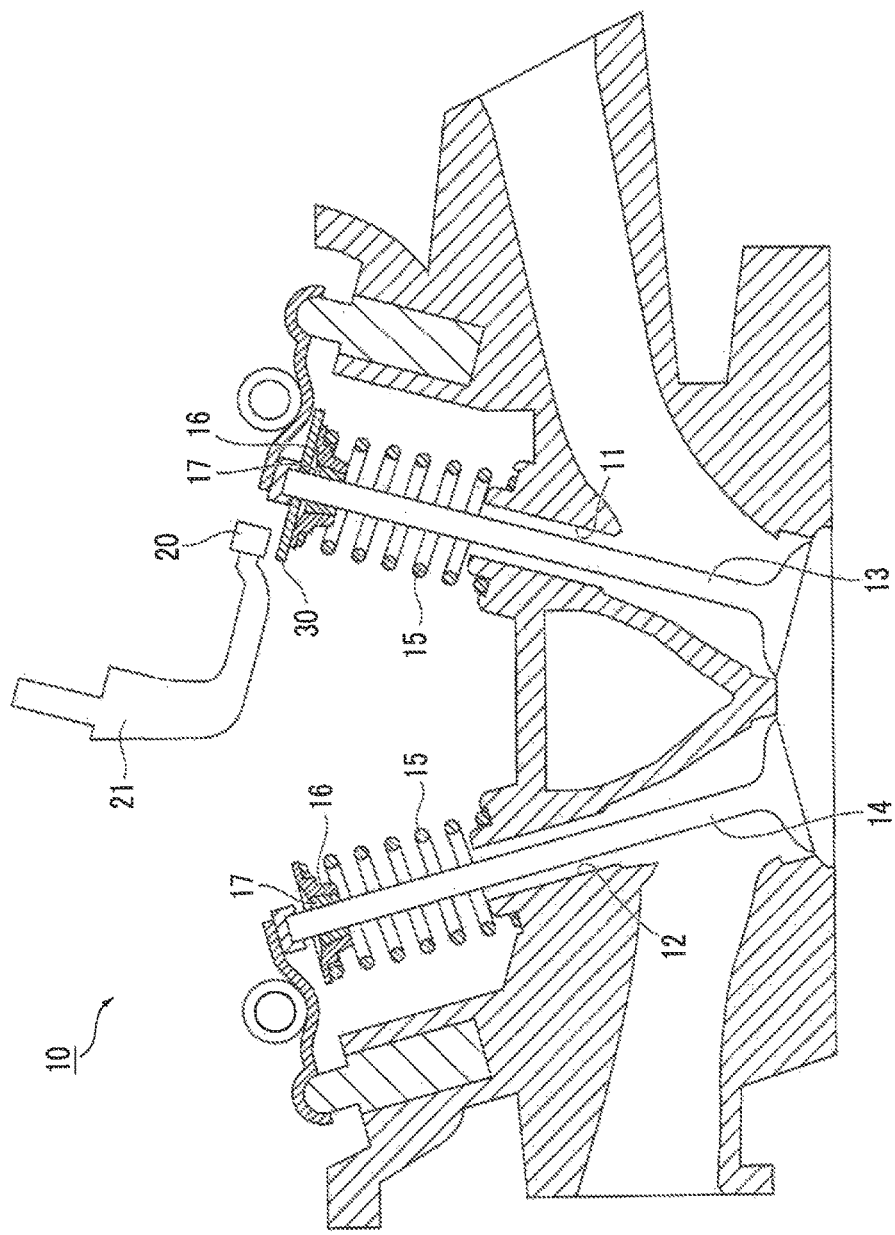
FIG. 1 is a vertical sectional view of a cylinder head, illustrating a method of detecting a lift amount of a valve according to the present disclosure.

Hereinafter, a method of detecting a lift amount of a valve according to an embodiment of the present disclosure will be described with reference to the accompanying drawings. Although the shape of an area-increasing jig in a plan view is a circular shape in the drawings, as a matter of course, area-increasing jigs having various shapes other than a circular shape, such as an oval shape, and a rectangular shape, in a plan view may be employed.

FIG. 1 is a vertical sectional view of a cylinder head, illustrating a method of detecting a lift amount of a valve according to the present disclosure.

A cylinder head 10 in FIG. 1 includes a plurality of valve guides 11, 12. A valve stem of an intake valve 13 and a valve stem of an exhaust valve 14 are respectively inserted through the valve guides 11, 12 with valve heads oriented downward. The intake valve 13 and the exhaust valve 14 are assembled to the cylinder head 10 such that the valve head of the intake valve 13 and the valve head of the exhaust valve 14 can open and close an intake port and an exhaust port of the cylinder head 10, respectively.

Each of the intake valve 13 and the exhaust valve 14 is assembled to the cylinder head 10 with a valve spring 15 disposed around each of the valve stems.

The intake valve 13 and the exhaust valve 14 are assembled to the cylinder head 10 in the following manner. A retainer 16 is attached to an upper end of each of the intake valve 13 and the exhaust valve 14, and then two half cotters 17 are assembled to each retainer 16.

In order to detect a valve lift amount, a sensor stay 21 is provided above the cylinder head 10, and a non-contact sensor 20, which is an eddy-current sensor having a high sensitivity, is attached to the sensor stay 21.

The cylinder head 10 illustrated in FIG. 1 is a small-sized cylinder head that is used in a downsized engine. Thus, the retainer 16, which is a measurement object used to measure of a valve lift amount, is also small in size.

Specifically, a diameter φ of a commonly-used retainer R illustrated in an upper part of FIG. 2 is about 23 mm, whereas a diameter φ of the retainer 16 having reduced size and weight as illustrated in a lower part of FIG. 2 is about 18.9 mm.

The retainer 16 having reduced size and weight as illustrated in the lower part of FIG. 2 is applied to the cylinder head 10 having a reduced size illustrated in FIG. 1.

Because the retainer 16 has a reduced size as described above and, further, the mounting position of the non-contact sensor 20 in the cylinder head 10 is limited, it is difficult to measure (an upward-downward travel amount of) the retainer 16 by using the non-contact sensor 20.

In view of this, in an example illustrated in the drawings, an area-increasing jig 30 is attached to an upper surface of the retainer 16 having a reduced size. The area-increasing jig 30 has a width larger than the width of the upper surface of the retainer 16.

Figure 3A:
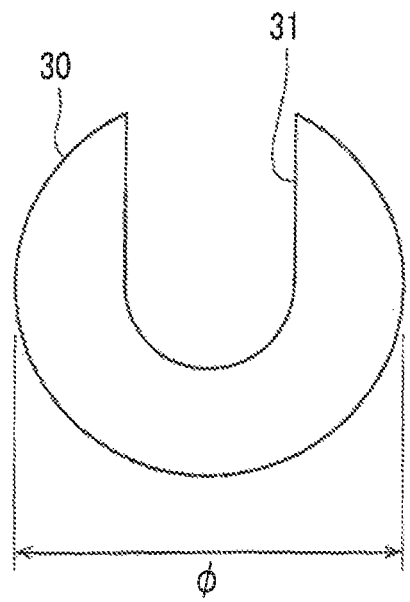
FIG. 3A is a plan view of an area-increasing jig according n embodiment.
Figure 3B:
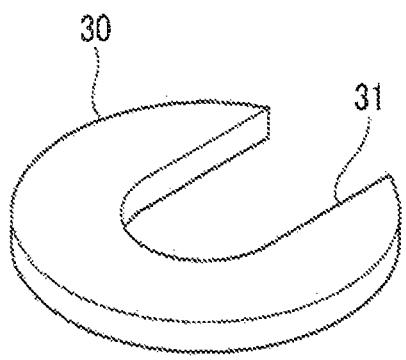
FIG. 3B is a perspective view of the area-increasing jig as viewed from a position obliquely above the area-increasing jig.

As illustrated in a plan view of FIG. 3A and a perspective view of FIG. 3B, the area-increasing jig 30 is a plate member having a circular shape in a plan view, and includes a groove 31 continuously extending from a portion of a side surface of the area-increasing jig 30 toward the center thereof. The diameter φ of the area-increasing jig 30 is about 23.0 mm, which is substantially the same as that of the commonly-used retainer.

According to a method of attaching the area-increasing jig 30 to the upper surface of the retainer 16, an adhesive agent is applied onto the upper surface of the retainer 16 in advance or an adhesive agent is applied onto a lower surface of the area-increasing jig 30 in advance, a valve stem of, for example, the intake valve 13 is inserted through the groove 31, and then the area-increasing jig 30 is bonded to the upper surface of the retainer 16.

In this way, the area-increasing jig 30 can be attached to the upper surface of the retainer 16 while the valve stem of, for example, the intake valve 13 is inserted through the groove 31 of the area-increasing jig 30. Thus, it is possible to attach the area-increasing jig 30 to the upper surface of the retainer 16 in a state in which the engine has been assembled, without the need to disassemble the engine or the cylinder head 10.

In addition, the area-increasing jig 30 is attached to the upper surface of the retainer 16 with the adhesive agent. Thus, the area-increasing jig 30 is prevented from dropping from the upper surface of the retainer 16 even when, for example, the intake valve 13 travels upward or downward.

In this case, for example, a dual-liquid epoxy adhesive agent having high thermal resistance may be used as an adhesive agent to be applied, in consideration of the fact that the temperature in the cylinder head 10 becomes about 130° C. at the maximum.

As described above, the area-increasing jig 30 having a larger width than the width of the upper surface of the retainer 16 is attached to the upper surface of the retainer 16. Thus, even when the retainer 16 has a reduced size and it is impossible or difficult to detect the retainer 16 by using the non-contact sensor 20, a lift amount of the area-increasing jig 30 can be detected by the non-contact sensor 20.

Before the retainer 16 (specifically, the area-increasing jig 30 disposed on the upper surface of the retainer 16) is measured by the non-contact sensor 20, a sensor output is calibrated before the measurement to achieve correspondence with preceding inspection data.

Specifically, before the non-contact sensor 20 is attached to the cylinder head 10, calibration of a sensor value is performed by using a gauge block (not illustrated) in consideration of the thickness of the area-increasing jig 30.

As illustrated in FIG. 1, for example, the intake valve 13 is caused to travel upward or downward and the distance to the area-increasing jig 30 is measured at given timing by the non-contact sensor 20 disposed above the retainer 16. In this way, a lift amount of, for example, the intake valve 13 can be accurately detected.

Next, an experiment and a result thereof will be described. The inventors performed an experiment. First, an area-increasing jig was attached to an upper surface of a retainer having a reduced size (a diameter φ of 18.9 mm) illustrated in the lower part of FIG. 2, and then an experiment of measuring a lift amount (an opening-closing amount) of a valve was performed. The area-increasing jig has the same diameter as that of the commonly-used retainer (having a diameter φ of 23 mm) illustrated in the upper part of FIG. 2, and has a thickness of 1 mm, which is a smallest possible thickness. Further, the area-increasing jig can be detected by an eddy-current non-contact sensor.

In this experiment, SCM 440 was used as the area-increasing jig, an epoxy adhesive agent manufactured by Henkel AG & Co. was used as an adhesive agent for bonding the upper surface of the retainer to the area-increasing jig, PU-05-345-401 manufactured by Applied Electronics Corporation was used as the eddy-current sensor, and a valve opening-closing timing analysis system manufactured by Yokogawa Electric Corporation was used as a measurement apparatus.

As a result of the experiment, it was confirmed that a lift amount of the valve in a state in which ignition is performed in the engine can be measured without any problem and inspection of Valvematic can be performed.

While the embodiment of the present disclosure has been described in detail with reference to the accompanying drawings, specific configurations are not limited to the foregoing embodiments and design changes and the like within the scope of the present disclosure are also included in the present disclosure.

What is claimed is:

1. A method of detecting a lift amount of a valve, the method comprising:
   attaching an area-increasing jig to an upper surface of a retainer attached to the valve, the area-increasing jig having a larger width than a width of the upper surface of the retainer; and
   detecting a lift amount of the valve by measuring a distance to the area-increasing jig by using a non-contact sensor disposed above the retainer.

2. The method according to claim 1, wherein
   the area-increasing jig is in a form of a plate and includes a groove continuously extending from a portion of a side surface of the area-increasing jig toward a center of the area-increasing jig.

* * * * *